(12) United States Patent
Tzikas et al.

(10) Patent No.: US 7,641,724 B2
(45) Date of Patent: Jan. 5, 2010

(54) MIXTURES OF REACTIVE DYES AND THEIR USE

(75) Inventors: Athanassios Tzikas, Pratteln (CH); Georg Roentgen, Freiburg (DE)

(73) Assignee: Huntsman International LLC, The Woodlands, TX (US)

( * ) Notice: Subject to any disclaimer, the term of this patent is extended or adjusted under 35 U.S.C. 154(b) by 350 days.

(21) Appl. No.: 10/579,364

(22) PCT Filed: Nov. 8, 2004

(86) PCT No.: PCT/EP2004/052844

§ 371 (c)(1), (2), (4) Date: May 15, 2006

(87) PCT Pub. No.: WO2005/052063

PCT Pub. Date: Jun. 9, 2005

(65) Prior Publication Data

US 2007/0124875 A1    Jun. 7, 2007

(30) Foreign Application Priority Data

Nov. 18, 2003  (EP)  ................... 03104263

(51) Int. Cl.
C09D 11/00    (2006.01)
C09B 62/006   (2006.01)
C09B 62/08    (2006.01)

(52) U.S. Cl. ............... 106/31.48; 106/31.52; 8/549

(58) Field of Classification Search ............. 106/31.48, 106/31.52; 8/546, 548, 549, 639, 641
See application file for complete search history.

(56) References Cited

U.S. PATENT DOCUMENTS

| | | | |
|---|---|---|---|
| 5,393,307 A | 2/1995 | Schwarz et al. | 8/549 |
| 5,690,698 A * | 11/1997 | Von Der Eltz et al. | 8/549 |
| 5,849,887 A * | 12/1998 | Lehmann et al. | 8/549 |
| 6,126,700 A * | 10/2000 | Bao-Kun et al. | 8/549 |
| 6,171,349 B1 * | 1/2001 | Lai et al. | 8/549 |
| 6,518,409 B2 * | 2/2003 | Tzikas et al. | 8/549 |
| 6,537,332 B1 * | 3/2003 | Tzikas et al. | 8/549 |
| 6,630,005 B1 * | 10/2003 | Tzikas et al. | 8/549 |
| 6,780,204 B2 * | 8/2004 | Lai et al. | 8/549 |

FOREIGN PATENT DOCUMENTS

| | | |
|---|---|---|
| EP | 0 582 893 | 2/1994 |
| JP | 2002-121415 | 4/2002 |
| WO | 00/43455 | 7/2000 |

OTHER PUBLICATIONS

English language abstract from Patent Abstracts of Japan for JP 2002-121415, Apr. 2002.

* cited by examiner

Primary Examiner—Helene Klemanski

(57) ABSTRACT

Dye mixtures comprising at least one dye of formula (I) together with at least one dye of formula (II) wherein the radicals are as defined in the claim, are suitable for dyeing or printing cellulosic fiber materials, while having a good build-up behavior, and yield dyeings of a deep shade having good fastness properties.

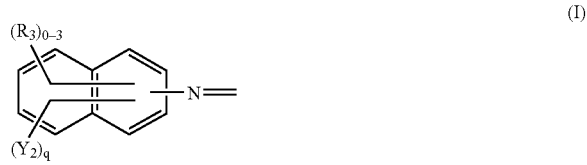

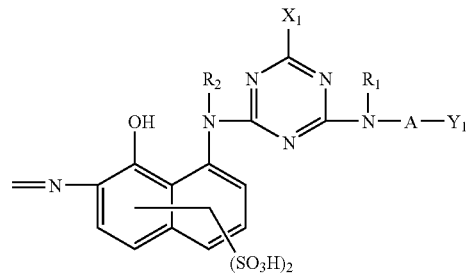

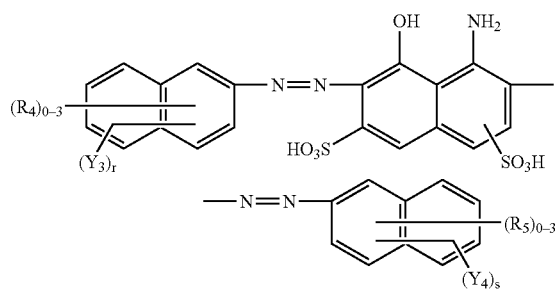

10 Claims, No Drawings

MIXTURES OF REACTIVE DYES AND THEIR USE

The present invention relates to mixtures of reactive dyes, which mixtures are suitable for dyeing or printing nitrogen-containing or hydroxyl-group-maintaining fibre materials and yield dyeings or prints having good all-round fastness properties.

The practice of dyeing has recently led to higher demands being made on the quality of the dyeings and the economy of the dyeing process. As a result, there continues to be a need for novel, readily obtainable dyeing compositions having good properties, especially in respect of their application.

Dyeing today requires reactive dyes that, for example, have sufficient substantivity and at the same time exhibit good ease of washing-off of unfixed dye. In addition, they should exhibit a good colour yield and a high reactivity, the objective being especially to obtain dyeings having high degrees of fixing. In many cases, the build-up behaviour of reactive dyes is not sufficient to meet the demands, especially in the dyeing of very deep shades.

The problem underlying the present invention is therefore to provide novel mixtures of reactive dyes, which mixtures are especially suitable for dyeing and printing fibre materials and possess the above-described qualities to a high degree. They should also yield dyeings having good all-round fastness properties, for example fastness to light and to wetting.

The present invention accordingly relates to dye mixtures comprising at least one dye of formula

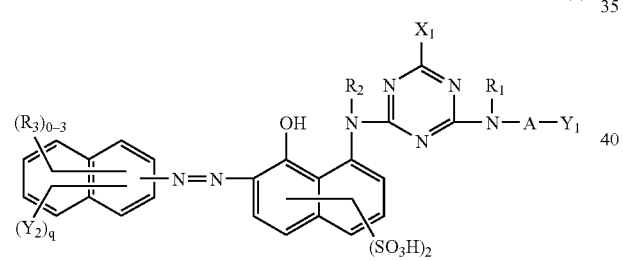

(1)

together with at least one dye of formula

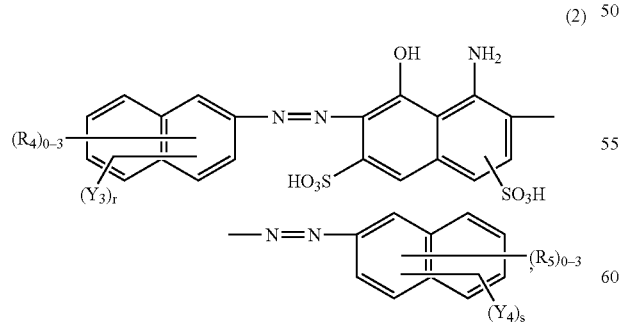

(2)

wherein $R_1$ and $R_2$ are each independently of the other hydrogen or unsubstituted or substituted $C_1$-$C_4$alkyl, $(R_3)_{0-3}$, $(R_4)_{0-3}$ and $(R_5)_{0-3}$ denote, each independently of the others, from 0 to 3 identical or differing substituents from the group halogen, $C_1$-$C_4$alkyl, $C_1$-$C_4$alkoxy, carboxy and sulfo, A is unsubstituted or substituted phenylene, naphthylene, or $C_2$-$C_8$alkylene which may be interrupted by oxygen, $X_1$ is halogen or a non-fibre-reactive substituent, and q is the number 0 or 1, r and s are each independently of the other the number 0 or 1, and the sum of r+s is the number 1 or 2, $Y_1$, $Y_2$, $Y_3$ and $Y_4$ are each independently of the others a fibre-reactive radical of formula $$—SO_2\text{-}Z \quad (3a),$$

$$—NH—CO—(CH_2)_m—SO_2\text{-}Z \quad (3b),$$

$$—CONH—(CH_2)_n—SO_2\text{-}Z \quad (3c),$$

$$—NH—CO—CH(Hal)—CH_2—Hal \quad (3d),$$

$$—NH—CO—C(Hal)=CH_2 \quad (3e) \text{ or}$$

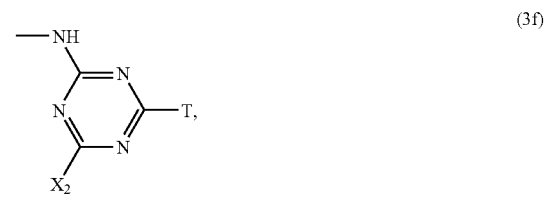

(3f)

wherein $X_2$ is halogen, T independently has the definition of $X_2$, is a non-fibre-reactive substituent or is a fibre-reactive radical of formula

(4a)

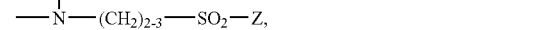

(4b)

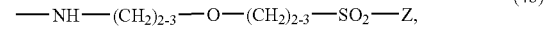

(4c)

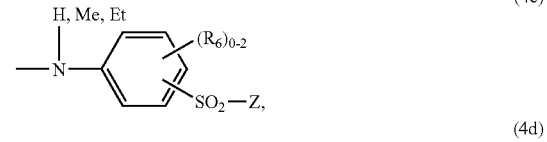

(4d)

or

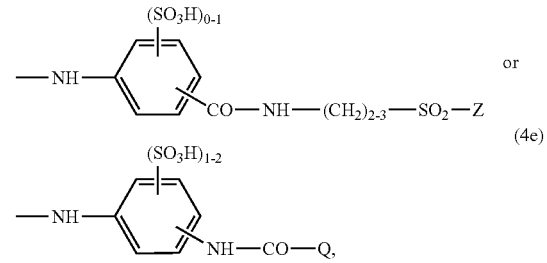

(4e)

$(R_6)_{0-2}$ denotes from 0 to 2 identical or differing substituents from the group halogen, $C_1$-$C_4$alkyl, $C_1$-$C_4$alkoxy and sulfo, Z is vinyl or a radical —$CH_2CH_2$—U and U is a group removable under alkaline conditions, Q is a group —CH(Hal)—$CH_2$Hal or —C(Hal)=$CH_2$, m and n are each independently of the other the number 2, 3 or 4, and Hal is halogen, at least one of the radicals $Y_3$ and $Y_4$ being a radical of formula (3b) or (3f).

In the radical of formula (4a), Me is the methyl radical and Et is the ethyl radical. The mentioned radicals come into consideration, besides hydrogen, as substituents at the nitrogen atom. Hydrogen is preferred.

In the radical of formula (4c), Me is the methyl radical and Et is the ethyl radical. The mentioned radicals come into consideration, besides a hydrogen, as substituents at the nitrogen atom.

As $C_1$-$C_4$alkyl there comes into consideration for $R_1$ and $R_2$, each independently of the other, for example methyl, ethyl, propyl, isopropyl, butyl, sec-butyl, tert-butyl or isobutyl, preferably methyl or ethyl and especially methyl. The mentioned alkyl radicals may be unsubstituted or may be substituted, for example, by hydroxy, sulfo, sulfato, cyano or by carboxyl. Preference is given to the corresponding unsubstituted radicals.

Preferably, $R_2$ is hydrogen and $R_1$ is hydrogen or one of the above-mentioned unsubstituted or substituted $C_1$-$C_4$alkyl radicals.

More especially, $R_2$ is hydrogen and $R_1$ is hydrogen, methyl or ethyl.

As $C_1$-$C_4$alkyl there comes into consideration for $R_3$, $R_4$, $R_5$ and $R_6$, each independently of the others, for example methyl, ethyl, n-propyl, isopropyl, n-butyl, sec-butyl, tert-butyl or isobutyl, preferably methyl or ethyl and especially methyl.

As $C_1$-$C_4$alkoxy there comes into consideration for $R_3$, $R_4$, $R_5$ and $R_6$, each independently of the others, for example methoxy, ethoxy, n-propoxy, isopropoxy, n-butoxy or isobutoxy, preferably methoxy or ethoxy and especially methoxy.

As halogen there comes into consideration for $R_3$, $R_4$, $R_5$ and $R_6$, each independently of the others, for example fluorine, chlorine or bromine, preferably chlorine or bromine and especially chlorine.

Preferably, $(R_3)_{0-3}$, $(R_4)_{0-3}$ and $(R_5)_{0-3}$ denote, each independently of the others, from 0 to 3 identical or differing substituents from the group halogen, $C_1$-$C_4$alkyl, $C_1$-$C_4$alkoxy and sulfo, especially from the group $C_1$-$C_4$alkyl, $C_1$-$C_4$alkoxy and sulfo.

When the diazo radical in the dye of formula (1) is naphthyl, there come into consideration for $(R_3)_{0-3}$ from 1 to 3 and especially 1 or 2 sulfo groups. Preferably, the naphthyl radical is bonded in the 2-position with respect to the azo group.

When the diazo radical in the dye of formula (1) is phenyl, there come into consideration for $(R_3)_{0-3}$ from 0 to 3, preferably from 0 to 2, identical or differing substituents from the group chlorine, methyl, methoxy and sulfo.

The diazo radical in the dye of formula (1) is preferably naphthyl.

q is preferably the number 0.

$(R_6)_{0-2}$ preferably denotes from 0 to 2 identical or differing substituents from the group $C_1$-$C_4$alkyl, $C_1$-$C_4$alkoxy and sulfo, especially methyl, methoxy and sulfo.

$R_6$ is more especially hydrogen.

When $X_1$ in the dye of formula (1) is halogen, there comes into consideration, for example, fluorine, chlorine or bromine.

When $X_1$ in the dye of formula (1) is a non-fibre-reactive substituent, there comes into consideration, for example, the definition given below for T as a non-fibre-reactive substituent, the preferred meanings given under T applying.

Preferably, $X_1$ is halogen, especially fluorine or chlorine and more especially chlorine.

$X_2$ in the fibre-reactive radical of formula (3f) is, for example, fluorine, chlorine or bromine, preferably fluorine or chlorine and especially chlorine.

T is preferably a non-fibre-reactive substituent or a fibre-reactive radical of formula (4a), (4b), (4c), (4d) or (4e) and especially a fibre-reactive radical of formula (4a), (4b), (4c), (4d) or (4e).

When T is a non-fibre-reactive substituent, it may be, for example, hydroxy; $C_1$-$C_4$alkoxy; $C_1$-$C_4$alkylthio which is unsubstituted or is substituted, for example, by hydroxy, carboxy or by sulfa; amino; amino substituted once or twice by $C_1$-$C_8$alkyl, the alkyl being unsubstituted or further substituted, for example, by sulfo, sulfato, hydroxy, carboxy or by phenyl, especially by sulfo or by hydroxy, and being-uninterrupted or interrupted one or more times by the radical —O—; cyclohexylamino; morpholino; N—$C_1$-$C_4$alkyl-N-phenylamino or phenylamino or naphthylamino, wherein the phenyl or naphthyl radical is unsubstituted or is substituted, for example, by $C_1$-$C_4$alkyl, $C_1$-$C_4$alkoxy, $C_1$-$C_4$-alkanoylamino, carboxy, sulfo or by halogen, and wherein the alkyl radical is unsubstituted or is substituted, for example, by hydroxy, sulfo or by sulfato.

Examples of suitable non-fibre reactive substituents T are amino, methylamino, ethylamino, β-hydroxyethylamino, N-methyl-N-β-hydroxyethylamino, N-ethyl-N-β-hydroxyethylamino, N,N-di-β-hydroxyethylamino, β-sulfoethylamino, cydohexylamino, morpholino, 2-, 3- or 4-chlorophenylamino, 2-, 3- or 4-methylphenylamino, 2-, 3- or 4-methoxyphenylamino, 2-, 3- or 4-sulfophenylamino, disulfophenylamino, 2-, 3- or 4-carboxyphenylamino, 1- or 2-naphthyl-amino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxy.

T denoting a non-fibre-reactive substituent is preferably $C_1$-$C_4$alkoxy, $C_1$-$C_4$alkylthio which is unsubstituted or is substituted by hydroxy, carboxy or by sulfo; hydroxy, amino, or N-mono- or N,N-di-$C_1$-$C_4$alkylamino unsubstituted or substituted in the(each) alkyl moiety by hydroxy, sulfato or by sulfo; morpholino; phenylamino which is unsubstituted or is substituted in the phenyl ring by sulfo, carboxy, acetylamino, chlorine, methyl or by methoxy, or N—$C_1$-$C_4$alkyl-N-phenylamino which is unsubstituted or is substituted in the same way, wherein the alkyl moiety is unsubstituted or is substituted by hydroxy, sulfo or by sulfato; or naphthylamino which is unsubstituted or is substituted by from 1 to 3 sulfo groups.

Non-fibre-reactive substituents T to which special preference is given are amino, N-methyl-amino, N-ethylamino, N-β-hydroxyethylamino, N-methyl-N-β-hydroxyethylamino, Nethyl-N-β-hydroxyethylamino, N,N-di-β-hydeoxyethylamino, β-sulfoethylamino, morpholino, 2-, 3- or 4-carboxyphenylamino, 2-, 3- or 4-sulfophenylamino and N—$C_1$-$C_4$alkyl-N-phenylamino.

In the case of the fibre-reactive radicals T of formulae (4a) and (4b), Z is preferably β-chloro-ethyl. In the case of the fibre-reactive radicals T of formulae (4c) and (4d), Z is preferably vinyl or β-sulfatoethyl.

When T is a fibre-reactive radical, it is preferably a radical of formula (4c) or (4d) and especially of formula (4c).

Hal in the fibre-reactive radicals of formulae (3d), (3e) and (4e) is preferably chlorine or bromine, especially bromine.

As the leaving group U there comes into consideration, for example, —Cl, —Br, —F, —OSO$_3$H, —SSO$_3$H, —OCO—CH$_3$, —OPO$_3$H$_2$, —OCO—C$_6$H$_5$, —SO$_2$—C$_1$-C$_4$alkyl or —OSO$_2$N(C$_1$-C$_4$alkyl)$_2$.

Preferably, U is a group of formula —Cl, —OSO$_3$H, —SSO$_3$H, —OCO—CH$_3$, —OCO—C$_6$H$_5$ or —OPO$_3$H$_2$, especially —Cl or —OSO$_3$H and more especially —OSO$_3$H.

Examples of suitable radicals Z are accordingly vinyl, β-bromo- or β-chloroethyl, β-acetoxy-ethyl, β-benzoyloxy-ethyl, β-phosphatoethyl, β-sulfatoethyl and β-thiosulfatoethyl. Z is preferably vinyl, β-chloroethyl or β-sulfatoethyl.

When A in the dyes of formula (1) is an unsubstituted or substituted phenylene radical or naphthylene radical, there come into consideration as substituents, for example, identical or differing radicals from the group halogen, C$_1$-C$_4$alkyl, C$_1$-C$_4$alkoxy and sulfo, preferably C$_1$-C$_4$alkyl, C$_1$-C$_4$alkoxy and sulfo and especially methyl, methoxy and sulfo. In that case the fibre-reactive radical Y$_1$ is a radical of formula (3a), (3b), (3c), (3d), (3e) or (3f), preferably of formula (3a) or (3c) and especially of formula (3a).

When A in the dyes of formula (1) is a C$_2$-C$_8$alkylene radical which may be interrupted by oxygen, there comes into consideration, for example, ethylene, propylene, isopropylene, butylene, isobutylene, —(CH$_2$)$_2$—O—(CH$_2$)$_2$—, —(CH$_2$)$_3$—O—(CH$_2$)$_2$— or —(CH$_2$)$_3$—O—(CH$_2$)$_3$—. In that case the fibre-reactive radical Y$_1$ is preferably a radical of formula (3a). A preferred C$_2$-C$_8$-alkylene radical which may be interrupted by oxygen, such as, for example, a radical of formula —(CH$_2$)$_{2-4}$—O—(CH$_2$)$_{2-4}$—, is a C$_2$-C$_6$alkylene radical which may be interrupted by oxygen, such as, for example, —(CH$_2$)$_2$—O—(CH$_2$)$_2$—, —(CH$_2$)$_3$—O—(CH$_2$)$_2$— or —(CH$_2$)$_3$—O—(CH$_2$)$_3$—, and especially a C$_2$-C$_4$alkylene radical which may be interrupted by oxygen, such as —(CH$_2$)$_2$—O—(CH$_2$)$_2$—.

In a preferred embodiment of the dye mixtures according to the invention, the radical -A-Y$_1$ is a radical of formula

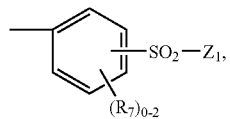

(5a)

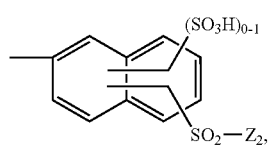

(5b)

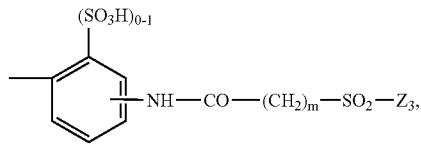

(5c)

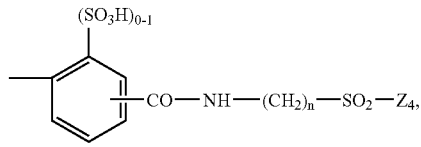

(5d)

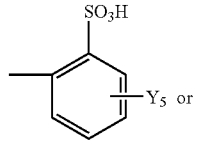

(5e)

—(CH$_2$)$_{2-4}$—O—(CH$_2$)$_{2-4}$—SO$_2$—Z$_5$, (5f)

wherein (R$_7$)$_{0-2}$ denotes from 0 to 2 identical or differing substituents from the group halogen, C$_1$-C$_4$alkyl, C$_1$-C$_4$alkoxy and sulfo, especially methyl, methoxy and sulfo, Y$_6$ is α,β-dibromopropionylamino or α-bromoacryloylamino, m is the number 2 or 3, especially 3, n is the number 2 or 3, especially 2, and Z$_1$, Z$_2$, Z$_3$, Z$_4$ and Z$_5$ are each independently of the others vinyl, β-chloroethyl or β-sulfato-ethyl.

Z$_1$ and Z$_2$ are preferably, each independently of the other, vinyl or β-sulfatoethyl.

Z$_3$ and Z$_5$ are preferably β-chloroethyl or β-sulfatoethyl, especially β-chloroethyl.

Z$_4$ is preferably β-chloroethyl or β-sulfatoethyl, especially β-sulfatoethyl.

In an especially preferred embodiment of the dye structures according to the invention, the radical of formula -A-Y$_1$ in the dye of formula (1) is a radical of formula (5a), (5b) or (5c), preferably of formula (5a) or (5b) and especially of formula (5a).

Preferably, the dye of formula (1) in the dye mixtures according to the invention is a dye of formula

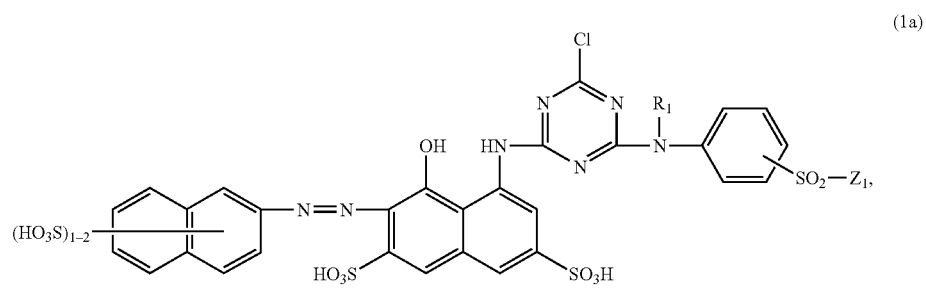

(1a)

wherein

R$_1$ is hydrogen, methyl or ethyl and

Z$_1$ is vinyl, β-chloroethyl or β-sulfatoethyl.

Preference is given to dyes of formula (2) wherein $(R_4)_{0-3}$ and $(R_5)_{0-3}$ have the definitions and preferred meanings given hereinabove, r and s are each the number 1 and the sum of r+s is the number 2, and one of the fibre-reactive radicals $Y_3$ and $Y_4$ is a radical of formula (3a), (3b), (3c), (3d) or (3e) and the other of the fibre-reactive radicals $Y_3$ and $Y_4$ is a radical of formula (3b) or (3f), especially (3f), the definitions and preferred meanings given hereinabove applying to the fibre-reactive radicals of formulae (3a), (3b), (3c), (3d), (3e) and (3f).

Preferably, $Y_3$ is a radical of formula (3f) and $Y_4$ is a radical of formula (3a), (3b), (3c), (3d) or (3e), especially (3a).

A dye of formula (2) to which special preference is given is a dye of formula

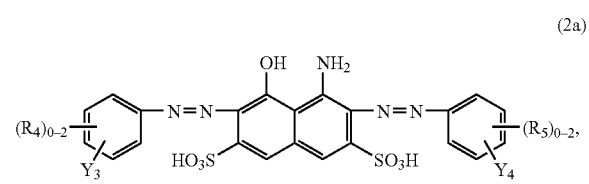

(2a)

wherein $(R_4)_{0-2}$ and $(R_5)_{0-2}$ denote, each independently of the other, from 0 to 2 identical or differing substituents selected from the group $C_1$-$C_4$alkyl, $C_1$-$C_4$alkoxy and sulfo, especially methyl, methoxy and sulfo, and one of the fibre-reactive radicals $Y_3$ and $Y_4$ is a radical of formula (3a), (3b), (3c), (3d) or (3e) and the other of the fibre-reactive radicals $Y_3$ and $Y_4$ is a radical of formula (3b) or (3f), especially (3f), the definitions and preferred meanings given hereinabove applying to the fibre-reactive radicals of formulae (3a), (3b), (3c), (3d), (3e) and (3f).

Preferably, $Y_3$ a radical of formula (3f) and $Y_4$ is a radical of formula (3a), (3b), (3c), (3d) or (3e), especially (3a).

In one embodiment of the present invention that is of interest, $R_4$ and $R_5$ are each a sulfo group.

A reactive dye of formula (2) to which even more special preference is given is a dye of formula in the form of a salt of an organic amine, for example in the form of the triethanolammonium salt.

The reactive dyes of formulae (1) and (2), and therefore also the dye mixtures, may comprise further additives, for example sodium chloride or dextrin.

The dyes of formulae (1) and (2) are present In the dye mixture according to the invention in a weight ratio of, for example, from 1:99 to 99:1, preferably from 5:95 to 95:5 and especially from 10:90 to 90:10.

The dyes of formulae (1) and (2) are known or can be prepared according to methods known per se. Dyes of formula (1) are disclosed, for example, in Kokai JP 50-000178. Dyes of formula (2) are described, for example, in U.S. Pat. Nos. 4,622,390 and 4,885,360.

The dye mixtures according to the invention can be prepared, for example, by mixing the individual dyes. Such a mixing process is carried out, for example, in suitable mills, for example ball mills or pin mills, and also in kneaders or mixers.

The dye mixtures according to the invention may, where appropriate, comprise other auxiliaries that, for example, improve handling or increase storage stability, such as, for example, buffers, dispersants or anti-dusts. Such auxiliaries are known to the person skilled in the art.

The dye mixtures according to the invention are suitable for dyeing and printing an extremely wide variety of materials, especially hydroxyl-group-maintaining or nitrogen-containing fibre materials. Examples are paper, silk, leather, wool, polyamide fibres and polyurethanes and also especially cellulosic fibre materials of all kinds. Such fibre materials are, for example, the natural cellulosic fibres, such as cotton, linen and hemp, and also cellulose and regenerated cellulose. The dye mixtures according to the invention are also suitable for dyeing or printing hydroxyl-group-containing fibres present in blend fabrics, e.g. mixtures of cotton with polyester fibres or polyamide fibres.

The present invention accordingly relates also to the use of the dye mixtures according to the invention in the dyeing or printing of hydroxyl-group-containing or nitrogen-containing, especially cellulosic, fibre materials.

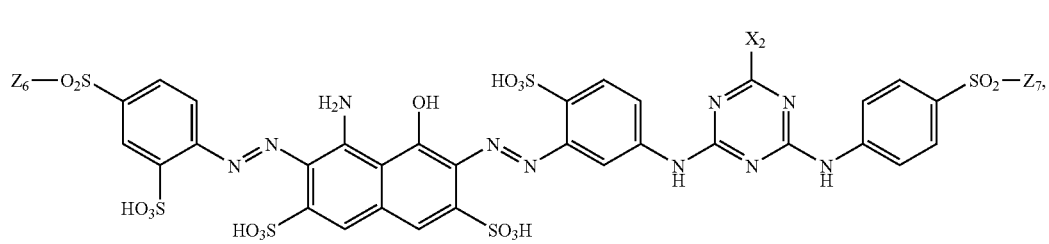

(2aa)

wherein $X_2$ is halogen, especially chlorine, and $Z_6$ and $Z_7$, each independently of the other, have the definitions and preferred meanings given hereinabove for Z and are preferably vinyl or -sulfatoethyl.

The reactive dyes of formulae (1) and (2) in the dye mixtures according to the invention comprise sulfo groups, each of which is either in the form of the free sulfonic acid or, preferably, in the form of a salt thereof, for example in the form of the sodium, lithium, potassium or ammonium salt, or The dye mixtures according to the invention can-be applied to the fibre material and fixed to the fibre in a variety of ways, especially in the form of aqueous dye solutions and dye print pastes. They are suitable both for the exhaust method and for dyeing in accordance with the pad-dyeing method; they can be used at low dyeing temperatures and require only short steaming times in the pad-steam method. The build-up behaviour is very good, the degrees of fixing are high and unfixed dye can be washed off easily, the difference between the degree of exhaust and the degree of fixing being remarkably small, that is to say the soaping loss is very low. The dye mixtures according to the invention are also suitable for printing, especially on cotton, and also for printing nitrogen-containing fibres, for example wool or silk or blend fabrics that contain wool.

The dyeings and prints produced using the dye mixtures according to the invention can be reproduced very well, have a high functional strength and a high fibre-to-dye binding stability in both the acidic and the alkaline range, and furthermore have good fastness to light and very good wet-fastness properties, such as fastness to washing, to water, to sea water, to cross-dyeing and to perspiration. Fibre-level and surface-level dyeings are obtained.

The dye mixtures according to the invention are also suitable as colorants for use in recording systems. Such recording systems are, for example, commercially available inkjet printers for paper or textile printing, or writing instruments, such as fountain pens and ballpoint pens and especially inkjet printers. For that purpose the dye mixture according to the invention is first brought into a form suitable for use in recording systems. A suitable form is, for example, an aqueous ink that comprises the dye mixture according to the invention as colorant. The inks can be prepared in customary manner by mixing together the individual constituents in the desired amount of water.

Substrates that come into consideration include the above-mentioned hydroxyl-group-containing or nitrogen-containing fibre materials, especially cellulosic fibre materials.

The dyes used in the aqueous inks should preferably have a low salt content, that is to say they should have a total content of salts of less than 0.5% by weight, based on the weight of the dyes. Dyes that have relatively high salt contents as a result of their preparation and/or as a result of the subsequent addition of diluents can be desalted, for example, by membrane separation procedures, such as ultrafiltration, reverse osmosis or dialysis.

The inks preferably have a total content of dyes of from 1 to 35% by weight, especially from 1 to 30% by weight and preferably from 1 to 20% by weight, based on the total weight of the ink. The preferred lower limit in this case is a limit of 1.5% by weight, preferably 2% by weight and especially 3% by weight The inks may comprise water-miscible organic solvents, for example $C_1$-$C_4$alcohols, e.g. methanol, ethanol, n-propanol, isopropanol, n-butanol, sec-butanol, tert-butanol or iso-butanol; amides, e.g. dimethylformamide or dimethylacetamide; ketones or ketone alcohols, e.g. acetone, diacetone alcohol; ethers, e.g. tetrahydrofuran or dioxane; nitrogen-containing heterocydic compounds, e.g. N-methyl-2-pyrrolidone or 1,3dimethyl-2-imidazolidone, poly-alkylene glycols, e.g. polyethylene glycol, or polypropylene glycol; $C_2$-$C_6$alkylene glycols and thioglycols, e.g. ethylene glycol, propylene glycol, butylene glycol, triethylene glycol, thiodiglycol, hexylene glycol and diethylene glycol; other polyols, e.g. glycerol or 1,2,6hexane-triol; and $C_1$-$C_4$alkyl ethers of polyhydric alcohols, e.g. 2-methoxyethanol, 2-2-methoxyethoxy)ethanol, 2-(2-ethoxyethoxy)ethanol, 2-[2-(2-methoxyethoxytethoxy]ethanol or 2-[2-(2-ethoxyethoxy)ethoxy] ethanol; preferably N-methyl-2-pyrrolidone, diethylene glycol, glycerol or especially 1,2-propylene glycol, usually in an amount of from 2 to 30% by weight, especially from 5 to 30% by weight and preferably from 10 to 25% by weight, based on the total weight of the ink.

In addition, the inks may also comprise solubilisers, e.g. ε-caprolactam.

The inks may comprise thickeners of natural or synthetic origin inter alia for the purpose of adjusting the viscosity.

Examples of thickeners that may be mentioned include commercially available alginate thickeners, starch ethers or locust bean flour ethers, especially sodium alginate on its own or in admixture with modified cellulose, e.g. methylcellulose, ethylcellulose, carboxymethyl-cellulose, hydroxyethylcellulose, methylhydroxyethylcellulose, hydroxypropyl cellulose or hydroxypropyl methylcellulose, especially with preferably from 20 to 25% by weight carboxy-methylcellulose. Synthetic thickeners that may be mentioned are, for example, those based on poly(meth)acrylic acids or poly(meth)acrylamides and also polyalkylene glycols having a molecular weight of e.g. from 2000 to 20 000, for example polyethylene glycol or poly-propylene glycol or the mixed polyalkylene glycols of ethylene oxide and propylene oxide.

The inks comprise such thickeners, for example, in an amount of from 0.01 to 2% by weight, especially from 0.01 to 1% by weight and preferably from 0.01 to 0.5% by weight, based on the total weight of the ink.

The inks may also comprise buffer substances, e.g. borax, borates, phosphates, poly-phosphates or citrates. Examples that may be mentioned include borax, sodium borate, sodium tetraborate, sodium dihydrogen phosphate, disodium hydrogen phosphate, sodium tripolyphosphate, sodium pentapolyphosphate and sodium citrate. They are used especially in amounts of from 0.1 to 3% by weight, preferably from 0.1 to 1% by weight, based on the total weight of the ink, in order to establish a pH value of, for example, from 4 to 9, especially from 5 to 8.5.

As further additives, the inks may comprise surfactants or humectants.

Suitable surfactants include commercially available anionic or non-ionic surfactants. As humectants in the inks according to the invention there come into consideration, for example, urea or a mixture of sodium lactate (advantageously in the form of a 50% to 60% aqueous solution) and glycerol and/or propylene glycol in amounts of preferably from 0.1 to 30% by weight, especially from 2 to 30% by weight.

Preference is given to inks having a viscosity of from 1 to 40 mpa·s, especially from 1 to 20 mPa·s and more especially from 1 to 10 mpa·s.

Furthermore, the inks may in addition comprise customary additives, e.g. anti-foams or especially preservatives that inhibit fungal and/or bacterial growth. Such additives are usually used in amounts of from 0.01 to 1% by weight, based on the total weight of the ink.

Preservatives that come into consideration include formaldehyde-yielding agents, e.g. paraformaldehyde and trioxane, especially aqueous, approximately 30 to 40% by weight formaldehyde solutions, imidazole compounds, e.g. 2-(4-thiazolyl)benzimidazole, thiazole compounds, e.g. 1,2-benzisothiazolin-3-one or 2-n-octyl-isothiazolin-3-one, iodine compounds, nitriles, phenols, haloalkylthio compounds or pyridine derivatives, especially 1,2-benzisothiazolin-3-one or 2-n-octyl-isothiazolin-3-one. A suitable preservative is e.g. a 20% by weight solution of 1,2-benzisothiazolin-3-one in dipropylene glycol (Proxel® GXL).

The inks may also comprise further additives, such as fluorinated polymers or telomers, e.g. polyethoxyperfluoro-alcohols (Forafac® or Zonyl® products) in an amount of e.g. from 0.01 to 1% by weight, based on the total weight of the ink.

In inkjet printing, individual droplets of the ink are sprayed onto a substrate in a controlled manner from a nozzle. For this purpose, predominantly the continuous inlet method and the drop-on-demand method are used. In the continuous inkjet method, the droplets are produced continuously and any droplets not required for the printing are conveyed to a collecting vessel and recycled, whereas in the drop-on-demand method droplets are produced and printed as required, that is to say droplets are produced only when required for the printing. The production of the droplets can be effected, for example, by means of a piezo-inkjet head or by means of thermal energy (bubble jet). Printing by means of a piezo-inkjet head and printing in accordance with the continuous inkjet method are preferred.

The present invention accordingly relates also to aqueous inks comprising the dye mixtures according to the invention and to the use of such inks in an inkjet printing method for the printing of various substrates, especially textile fibre materials, the definitions and preferred meanings mentioned above applying to the dye mixtures, the inks and the substrates.

The following Examples serve to illustrate the invention. Unless otherwise indicated, the temperatures are given in degrees Celsius, parts are parts by weight and percentages relate to % by weight. Parts by weight relate to parts by volume in a ratio of kilograms to liters.

EXAMPLE 1

100 parts of a cotton fabric are introduced at a temperature of 60° C. into a dyebath comprising 0.6 part of the dye of formula

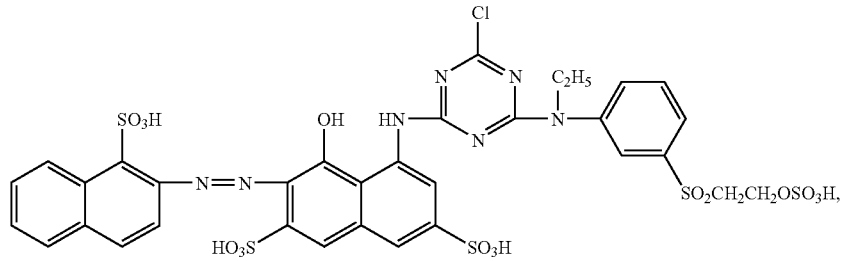

(101)

5.4 parts of the dye of formula

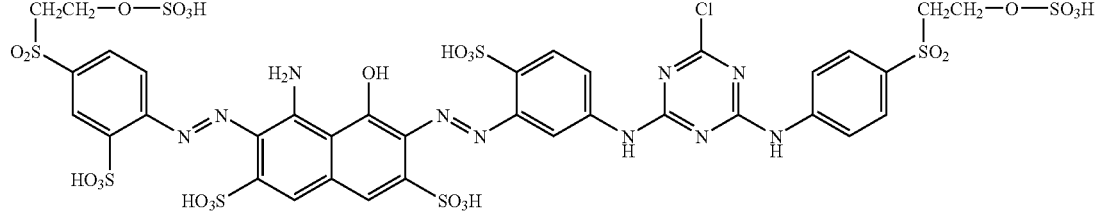

(102)

and 60 parts of sodium chloride in 1000 parts of water. After 45 minutes at 60° C., 20 parts of calcined soda are added. The temperature of the dyebath is maintained at 60° C. for a further 45 minutes. The dyed fabric is then rinsed and dried in the usual manner. A navy-blue dyeing having good fastness properties is obtained.

EXAMPLES 2 AND 3

Following the procedure given in Example 1 but, instead of using 0.6 part of the dye of formula (101), using 0.6 part of the dye of formula

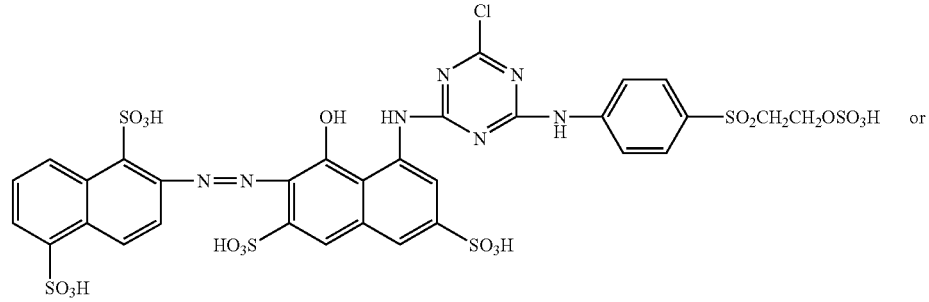

(103)

or

-continued
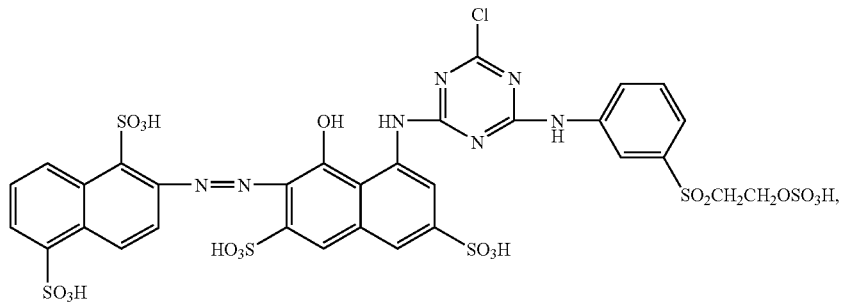
(104)
there is likewise obtained a navy-blue dyeing having good fastness properties.
EXAMPLES 4 TO 9
Following the procedure given in Example 1 but, instead of using 5.4 parts of the dye of formula (102), using 5.4 parts of the dye of formula
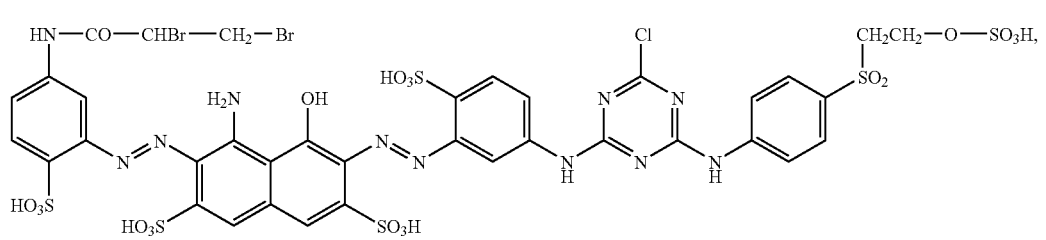
(105)
4
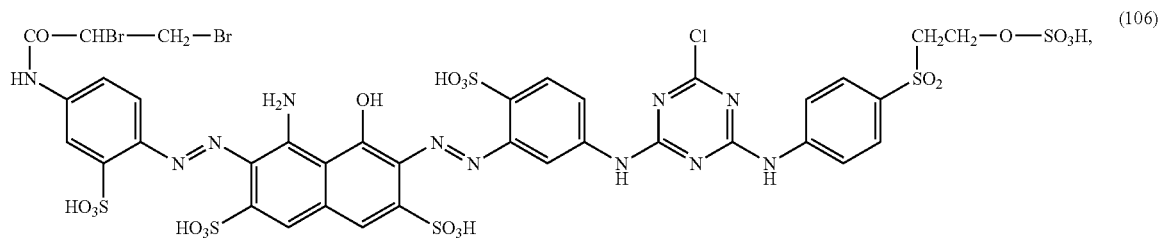
(106)
5
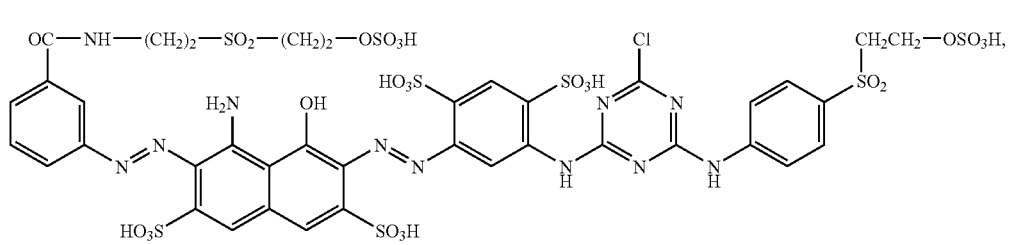
(107)
6

-continued

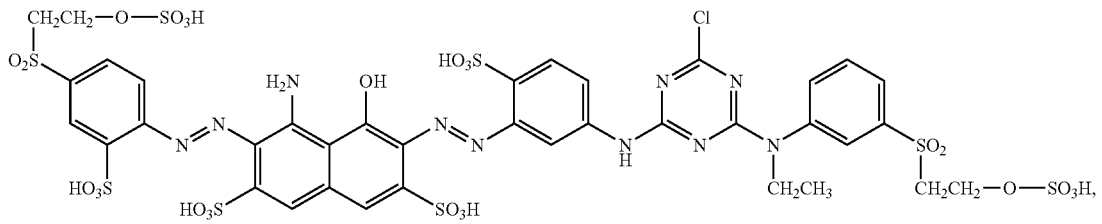
(108)

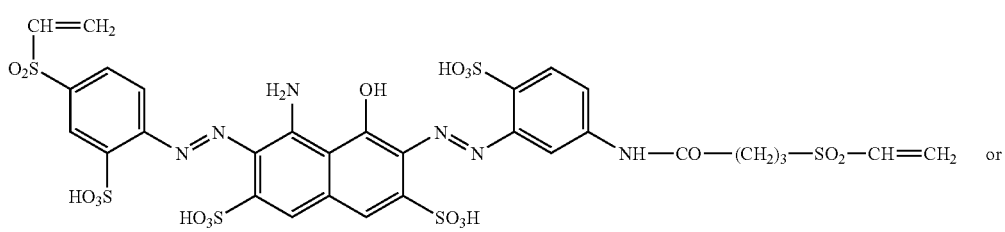
(109)

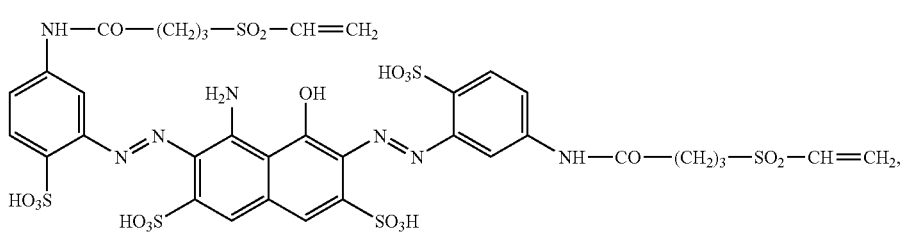
(110)

there are likewise obtained navy-blue dyeings having food fastness properties.

EXAMPLE 8

(a) Mercerised cotton satin is pad-dyed with a liquor containing 30 g/l of sodium carbonate and 50 g/l of urea (70% liquor pick) and dried.

(b) Using a drop-on-demand inkjet head (bubble jet), there is printed onto the cotton satin pretreated according to step (a) an aqueous ink containing
- 10% by weight of a mixture of 0.6 part of the reactive dye of formula (101) and 5.4 parts of the reactive dye of formula (102),
- 20% by weight of 1,2-propylene glycol and
- 70% by weight of water.

The print is fully dried and fixed in saturated steam at 102° C. for 8 minutes, cold-rinsed, washed-off at the boil, rinsed again and dried.

A navy-blue print having good fastness properties is obtained.

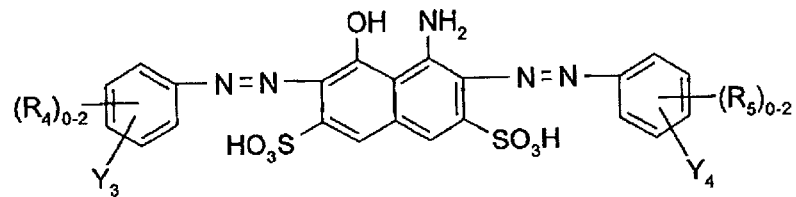

What is claimed is:

1. A dye mixture comprising at least one dye of formula

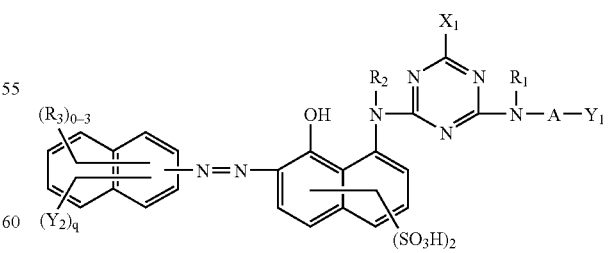
(1)

together with at least one dye of formula

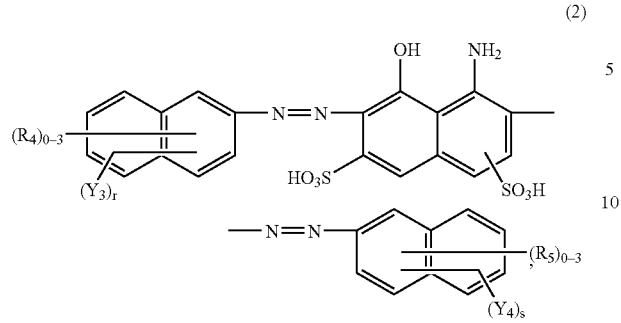

wherein $R_1$ and $R_2$ are each independently of the other hydrogen or unsubstituted or substituted $C_1$-$C_4$ alkyl, $(R_3)_{0-3}$ denotes from 0 to 3 identical or differing substituents from the group halogen, $C_1$-$C_4$ alkyl, $C_1$-$C_4$ alkoxy, carboxy and sulfo, A is unsubstituted or substituted phenylene, naphthylene, or $C_2$-$C_8$ alkylene which may be interrupted by oxygen, $X_1$ is halogen or a non-fibre-reactive substituent, q is the number 0 or 1, $Y_1$, $Y_2$, $Y_3$ and $Y_4$ are each independently of the others a fibre-reactive radical of formula —$SO_2$-Z (3a), —NH—CO—$(CH_2)_m$—$SO_2$-Z (3b), —CONH—$(CH_2)_n$—$SO_2$-Z (3c), —NH—CO—CH(Hal)—$CH_2$-Hal (3d), —NH—CO—C(Hal)=$CH_2$ (3e) or

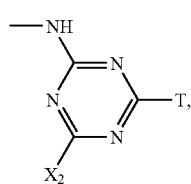
(3f)

wherein $X_2$ is halogen, T independently has the definition of $X_2$, is a non-fibre-reactive substituent or is a fibre-reactive radical of formula

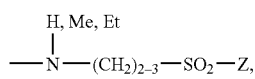
(4a)

—NH—$(CH_2)_{2-3}$—O—$(CH_2)_{2-3}$—$SO_2$—Z, (4b)

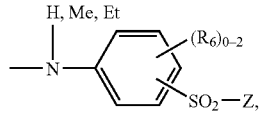
(4c)

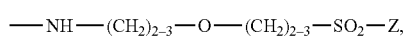
(4d)

or

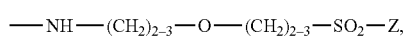
(4e)

$(R_6)_{0-2}$ denotes from 0 to 2 identical or differing substituents from the group halogen, $C_1$-$C_4$ alkyl, $C_1$-$C_4$ alkoxy and sulfo, Z is vinyl or a radical —$CH_2$—$CH_2$—U and U is a group removable under alkaline conditions, Q is a group —CH(Hal)—$CH_2$-Hal or —C(Hal)=$CH_2$, m and n are each independently of the other the number 2, 3 or 4, and Hal is halogen, and $(R_4)_{0-2}$ and $(R_5)_{0-2}$ denote, each independently of the other, from 0 to 2 identical or differing substituents selected from the group $C_1$-$C_4$ alkyl, $C_1$-$C_4$ alkoxy and sulfo, and one of the fibre-reactive radicals $Y_3$ and $Y_4$ is a radical of formula (3a), (3b), (3e), (3d) or (3e) and the other of the fibre-reactive radicals $Y_3$ and $Y_4$ is a radical of formula (3b) or (3f).

2. A dye mixture according to claim 1, wherein $R_1$ is hydrogen, methyl or ethyl and $R_2$ is hydrogen.

3. A dye mixture according to claim 1, wherein $X_1$ is chlorine.

4. A dye mixture according to claim 1, wherein -A-$Y_1$ is a radical of formula

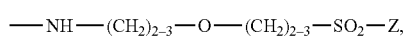
(5a)

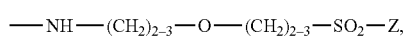
(5b)

or

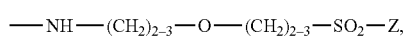
(5c)

wherein $(R_7)_{0-2}$ denotes from 0 to 2 identical or differing substituents from the group halogen, $C_1$-$C_4$alkyl, $C_1$-$C_4$alkoxy and sulfo, m is the number 2 or 3, and $Z_1$, $Z_2$ and $Z_3$ are each independently of the others vinyl, β-chloroethyl or β-sulfatoethyl.

5. A dye mixture according to claim 1, wherein the dye of formula (1) is a dye of formula

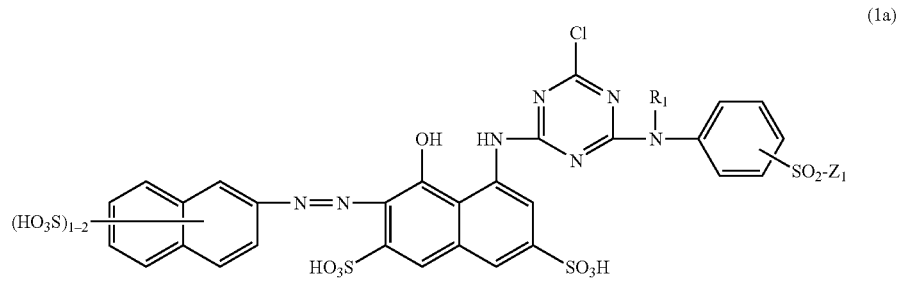

wherein

R₁ is hydrogen, methyl or ethyl and

Z₁ is vinyl, β-chloroethyl or β-sulfatoethyl.

6. A method of dyeing or printing of hydroxyl-group-containing or nitrogen-containing fibre material, which comprises contacting said material with a tinctorially effective amount of a dye mixture according to claim 1.

7. A method according to claim 6, wherein cellulosic fibre material is dyed or printed.

8. An aqueous ink comprising a dye mixture according to claim 1.

9. A method of printing of hydroxyl-group-containing or nitrogen-containing fibre material, which comprises printing said material with an aqueous ink according to claim 8 in an inkjet printer.

10. A method according to claim 6, wherein cotton-containing fibre material is dyed or printed.

* * * * *

UNITED STATES PATENT AND TRADEMARK OFFICE
CERTIFICATE OF CORRECTION

PATENT NO. : 7,641,724 B2
APPLICATION NO. : 10/579364
DATED : January 5, 2010
INVENTOR(S) : Tzikas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 447 days.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,641,724 B2
APPLICATION NO. : 10/579364
DATED : January 5, 2010
INVENTOR(S) : Tzikas et al.

It is certified that error appears in the above-identified patent and that said Letters Patent is hereby corrected as shown below:

Title Page 1, item [57] second column, the formula for the dye of formula (I) should appear as follows:

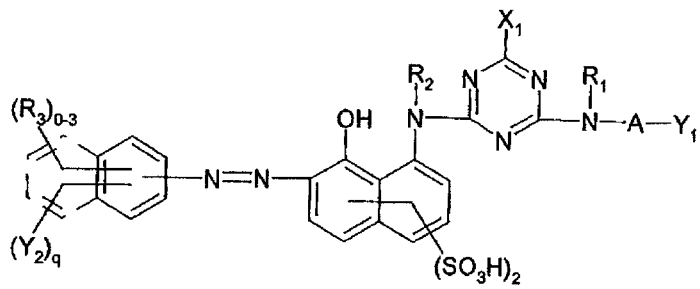

Title Page 1, item [57] second column, the formula for the dye of formula (II) should appear as follows:

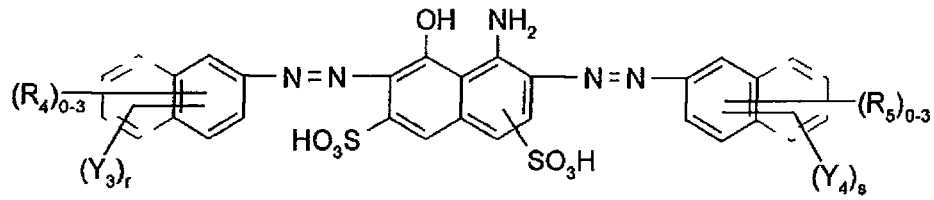

Column 1, lines 35-45, the formula for the dye of formula (1) should appear as follows:

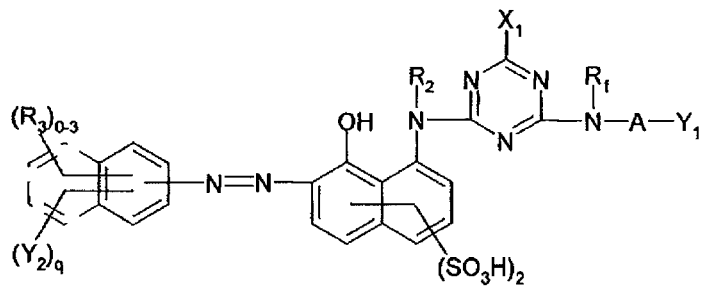

Column 1, lines 52-62, the formula for the dye of formula (2) should appear as follows:

Signed and Sealed this
Twenty-fourth Day of April, 2012

David J. Kappos
*Director of the United States Patent and Trademark Office*

CERTIFICATE OF CORRECTION (continued)
U.S. Pat. No. 7,641,724 B2

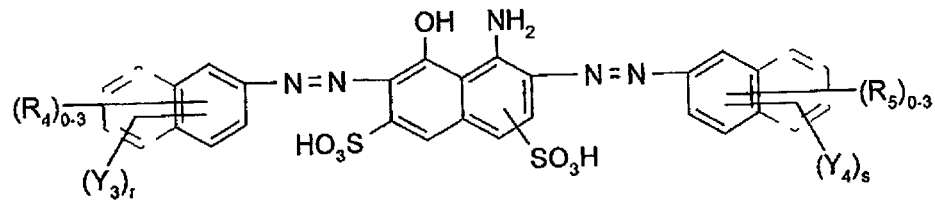

Column 16, lines 51-60, claim 1, the formula for the dye of formula (1) should appear as follows:

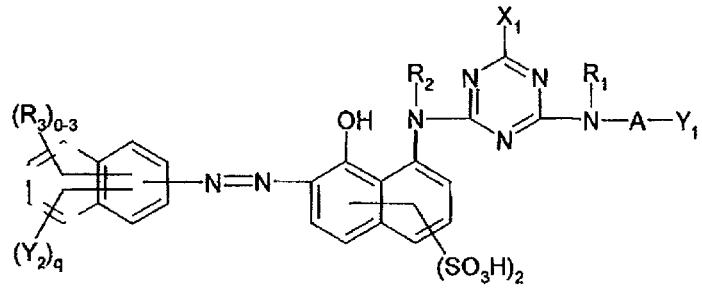

Column 17, lines 5-15, claim 1, the formula for the dye of formula (2) should appear as follows: